(12) United States Patent
Georgescu et al.

(10) Patent No.: US 10,534,865 B2
(45) Date of Patent: Jan. 14, 2020

(54) FLEXIBLE CAD FORMAT

(71) Applicant: FUJITSU LIMITED, Kawasaki-shi, Kanagawa (JP)

(72) Inventors: Serban Georgescu, London (GB); Peter Chow, Kent (GB); Tetsuyuki Kubota, Acton (GB); Kouji Demizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 841 days.

(21) Appl. No.: 14/494,954

(22) Filed: Sep. 24, 2014

(65) Prior Publication Data
US 2015/0317413 A1    Nov. 5, 2015

(30) Foreign Application Priority Data

May 1, 2014   (EP) .................................... 14166763

(51) Int. Cl.
G06T 1/20      (2006.01)
G06F 17/50     (2006.01)
G06T 17/20     (2006.01)

(52) U.S. Cl.
CPC .......... *G06F 17/50* (2013.01); *G06F 17/5018* (2013.01); *G06T 17/20* (2013.01); *G06F 2217/04* (2013.01)

(58) Field of Classification Search
CPC ....................................................... G06F 17/50
See application file for complete search history.

(56) References Cited

U.S. PATENT DOCUMENTS

2003/0123724 A1* 7/2003 McClelland .......... G06T 11/001
                                              382/165
2004/0153824 A1* 8/2004 Devarajan ............... G06T 17/00
                                              714/38.1
2005/0285879 A1* 12/2005 Suzuki .................. G06T 19/006
                                              345/633

(Continued)

FOREIGN PATENT DOCUMENTS

GB     2474900 A      5/2011
WO     2004/010384 A2  1/2004

OTHER PUBLICATIONS

Xianguang Luo et al. "Key Technology Research on Data Conversion Between B-Rep Based CAD and VR Model", 2009 IEEE, pp. 104-107.*

(Continued)

*Primary Examiner* — Brian W Wathen
*Assistant Examiner* — Abdou K Seye
(74) *Attorney, Agent, or Firm* — Staas & Halsey LLP

(57) ABSTRACT

A method of translating a Computer Aided Design CAD model of a product constructed for Computer Aided Engineering CAE analysis into a flexible form, the method comprising: converting the original CAD model into a different format to provide a new-format CAD model; providing visualization data including: an assembly tree extracted from the original CAD model, the assembly tree including each component of the assembly forming the product; and visualization information from the original CAD model for each assembly face in the assembly tree; and providing geometry information including matching information unambiguously identifying each assembly face; wherein the geometry information allows the assembly faces to be matched with the CAD faces in the new-format CAD model.

16 Claims, 16 Drawing Sheets

(56) References Cited

U.S. PATENT DOCUMENTS

| | | | | |
|---|---|---|---|---|
| 2007/0118243 | A1* | 5/2007 | Schroeder | G16H 50/50 700/118 |
| 2007/0124713 | A1* | 5/2007 | Ando | G06T 7/001 250/307 |
| 2012/0109590 | A1* | 5/2012 | Trainer | G06F 17/50 703/1 |
| 2014/0039847 | A1* | 2/2014 | Georgescu | G06F 9/4881 703/1 |
| 2014/0212022 | A1* | 7/2014 | Geshel | G06T 7/0006 382/149 |

OTHER PUBLICATIONS

R. Ganesan "A feature-based framework for transforming and representing multiple format CAD for virtual prototyping", pp. 129-145 (Year: 1995)*

Norman A Graf "Mesh2gdml:from CAD to Geant4", pp. 1011-1014 (Year: 2012).*

Gabriel Taubin et al. "Geometry Coding and VRML", pp. 1228-1243 (Year: 1998).*

Extended European Search Report dated Jan. 7, 2015 in corresponding European Patent Application No. 14166763.4.

Wu et al., "The incremental editing of faceted models in an integrated design environment", Computer-Aided Design, 36, 2004, pp. 821-833.

Mervyn et al., "Developing distributed applications for integrated product and process design", Computer-Aided Design, 36, 2004, pp. 679-689.

Zheng et al., "A Mechanism for Persistently Naming Topological Entities", The 8$^{th}$ International Conference on Computer Supported Cooperative Work in Design Proceedings, IEEE, 2003, pp. 84-89.

Chung et al., "Enabled dynamic tasks planning in Web-based virtual manufacturing environments", Computers in Industry, 59, 2008, pp. 82-95.

European Search Report dated Oct. 26, 2017 in corresponding European Patent Application No. 14166763.4.

* cited by examiner

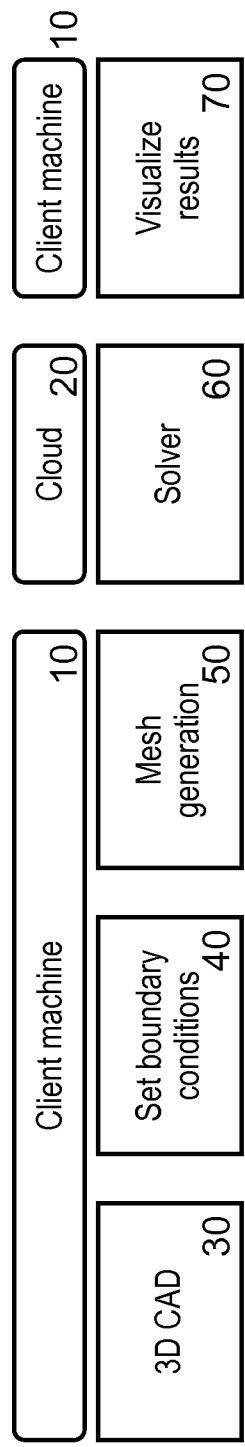
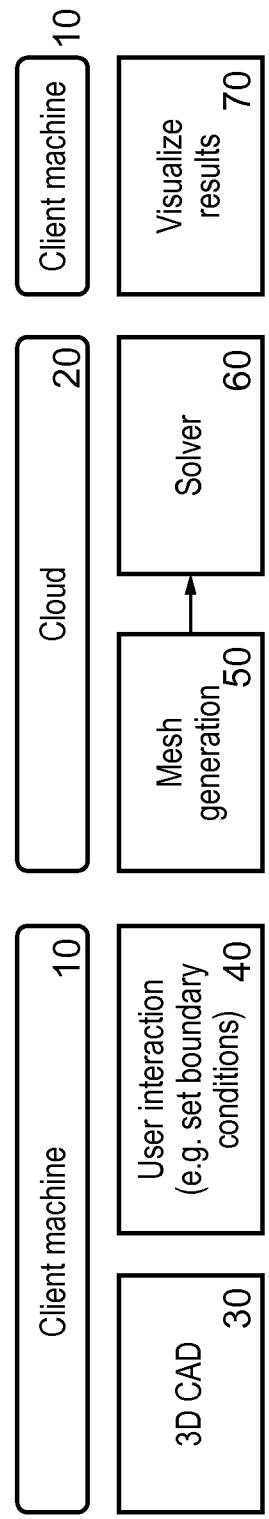

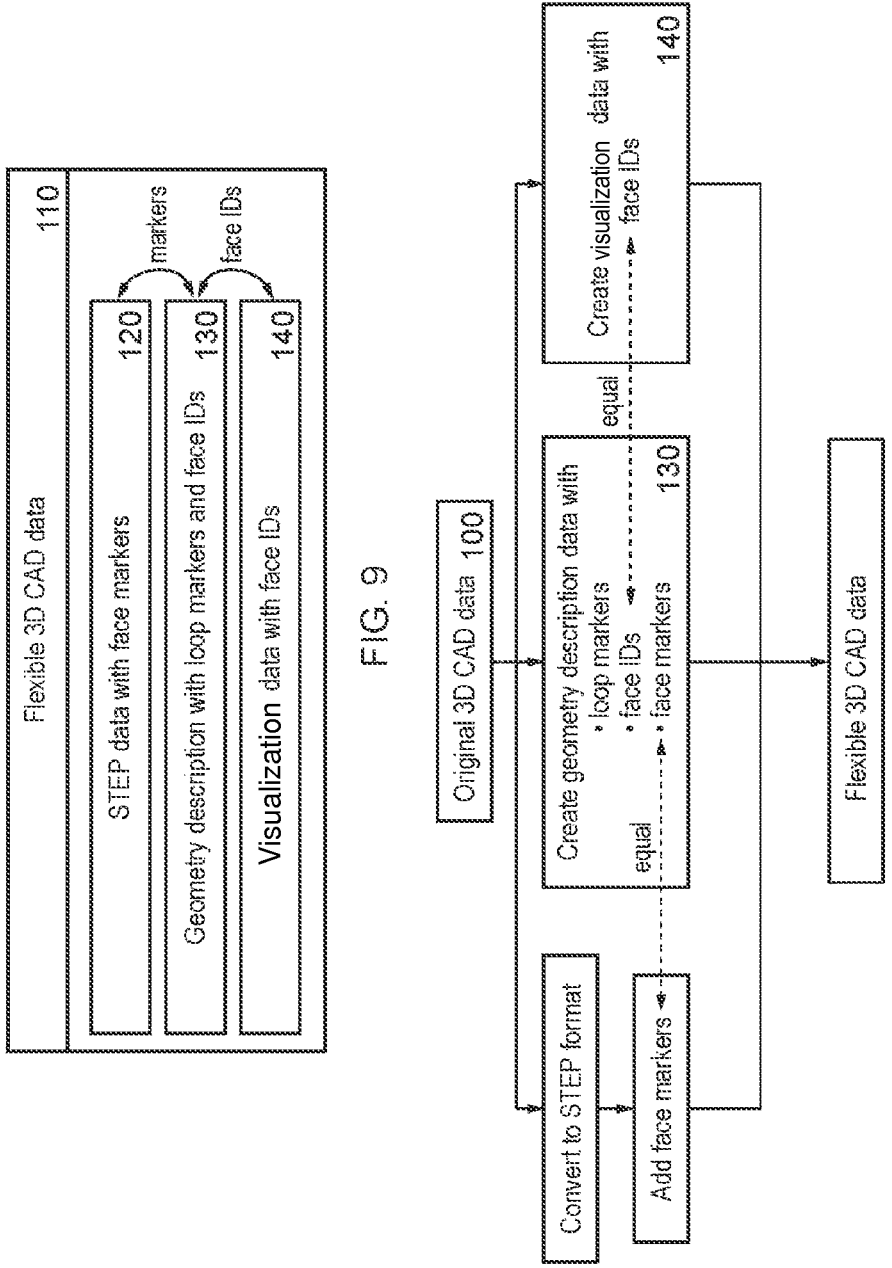

```
Begin Space0
    No 0
    Parent root
    JointType Free
    TYPE 1
End
Begin Space
    No 1
    ParentNo 0
    JointType Fixed
    TYPE 1
End
Begin model_asm
    No 2
    ParentNo 1
    CAD-ID 1 0
...
End
Begin part1
    No 3
    ParentNo 2
    CAD-ID 1 1 39
...
    ShapeB part1.slb
    Volume 270000
END
Begin part2
    No 4
    ParentNo 2
    CAD-ID 1 1 42
...
    ShapeB part2.slb
    Volume 28274.3
End
```

```
Begin model
Begin part1
  Face_size8
    Face 0
      Face-id 43
      Color 0 ffffff
      Loop_size 2
        Loop 0
          Edge_size 4
          Edge 0 3
            45.00000 0.00000 0.00000
            45.00000 50.00000 0.00000
            45.00000 100.00000 0.00000
          Edge 1 3
            45.00000 100.00000 0.00000
            22.50000 100.00000 0.00000
            0.00000 100.00000 0.00000
          Edge 2 3
            0.00000 100.00000 0.00000
            0.00000 50.00000 0.00000
            0.00000 0.00000 0.00000
          Edge 3 3
            0.00000 0.00000 0.00000
            22.50000 0.00000 0.00000
            45.00000 0.00000 0.00000
        Loop 1
          Edge_size 4
          Edge 0 3
            55.00000 0.00000 0.00000
            55.00000 50.00000 0.00000
            55.00000 100.00000 0.00000
          Edge 1 3
            55.00000 0.00000 0.00000
            77.50000 0.00000 0.00000
            100.00000 0.00000 0.00000
          Edge 2 3
            100.00000 0.00000 0.00000
            100.00000 50.00000 0.00000
            100.00000 100.00000 0.00000
          Edge 3 3
            100.00000 100.00000 0.00000
            77.50000 100.00000 0.00000
            55.00000 100.00000 0.00000
    Face 1
      Face_id 48
      Color 0 dfffff
      Loop_size 2
        Loop 0
          Edge_size 4
          Edge 0 3
            45.00000 0.00000 30.00000
            45.00000 50.00000 30.00000
            45.00000 100.00000 30.00000
          Edge 1 3
            0.00000 0.00000 30.00000
            22.50000 0.00000 30.00000
            45.00000 0.00000 30.00000
          Edge 2 3
            0.00000 100.00000 30.00000
            0.00000 50.00000 30.00000
            0.00000 0.00000 30.00000
          Edge 3 3
            45.00000 100.00000 30.00000
            22.50000 100.00000 30.00000
            0.00000 100.00000 30.00000
        Loop 1
          Edge_size 4
......
```

FIG. 20

```
Begin Boundary
    Group 1
    Target 1 1 39 Face_id 43
    Move 0 0 0
    Rotate INF INF INF
End
Begin Boundary
    Group 1
    Target 1 1 39 Face_id 48
    Move 0 0 0
    Rotate INF INF INF
End
```

FIG. 21

FLEXIBLE CAD FORMAT

CROSS-REFERENCE TO RELATED APPLICATIONS

This application claims the benefit of European Application No. 14166763.4, filed May 1, 2014, in the European Intellectual Property Office, the disclosure of which is incorporated herein by reference.

BACKGROUND

1. Field

The present invention relates to computer aided design (CAD) and the analysis of models constructed in CAD software packages.

2. Description of the Related Art

Computer Aided Engineering (CAE), the use of computer software for the purpose of modeling and simulating the behavior of products in order to improve their quality, has become nearly ubiquitous in the manufacturing industry. Areas covered by CAE include but are not limited to stress and thermal analysis, fluid dynamics and kinematics.

Most CAE analysis systems are based on geometrical data stored in various 3D CAD formats. Examples of such formats are open standards like IGES (Initial Graphics Exchange Specification) or STEP (International Standard for Product Data Exchange) and proprietary formats like Pro Engineer, ACIS or Parasolid. After reading geometrical data stored in one such format, analysis software converts it to its internal representation. Thereafter, information may be set by the user for modeling purposes. This information may include boundary conditions (which are known values in the model such as intake and exit conditions, physical load, pressure conditions etc) and material properties. A computational mesh is usually generated. User input, together with mesh generation, are sometimes referred to as pre-processing. The mesh, together with the additional information set by the user is then sent to Solver software that uses numerical methods like the Finite Element Method to solve underlying algorithms in the model and thus perform the analysis. Finally, the results are visualized using Visualization software.

In recent years the analyzed models have become more and more complex. To tackle this complexity, the Solver software, which is generally the most resource and time consuming part of the analysis, has been offloaded to a cloud environment. The cloud can be viewed as remote, networked computing functionality, often sold as a service and usually arranged as servers on the internet. It can be much more powerful/fast than a user terminal. By using the resources made available in the cloud, it has become possible to perform analyses much larger than those possible on the client machine and in a much shorter time. Moreover, the move to a cloud model has made possible a much more efficient use of the resources, both hardware and software, available to a CAD modeling organization. The general layout of such a system is shown in FIG. 1.

In FIG. 1, a schematic diagram illustrates CAD/CAE tasks and their division between a client machine 10 and the cloud 20 according to the prior art. In the prior art, a 3D CAD model 30 is available on the client machine and used to set boundary conditions 40 and for mesh generation 50. The solver software 60 uses numerical methods for analysis and is provided on the cloud. The results are then returned to client machine 10 and visualized 70.

However, with the models continuing to increase in complexity, operations like setting boundary conditions are also becoming difficult for the client machine to handle. Indeed, just importing the 3D CAD data corresponding to a model of a current laptop or a server can take from tens of minutes to hours on a powerful workstation and the manipulation of such a model requires a powerful processor and graphic card.

Some operations can be performed using a "light-weight geometry format" also referred to as a "visualization format". This is a simpler model than the full CAD model. Often, the main distinction between a CAD model and a "light-weight geometry format" is that the CAD model contains the full (continuous) analytical description of the model while the "light-weight geometry format" contains a discretized version of it.

Good candidates for visualization formats are those that store only the boundary of the geometry in a faceted form, like the STL format, VRML format, JT format or similar.

Setting analysis information like boundary conditions using a light-weight geometry format is possible, but made difficult by the fact that an accurate mesh can only be generated starting from the full 3D CAD data. Hence, there is a need to map the assigned information from the light-weight geometry format to the full 3D CAD data used for mesh generation.

The current generation of CAE systems uses the original larger 3D data to create the computational mesh. Based on this original data, they dynamically generate geometry in the light-weight visualization format and use it for the interaction with the user. Hence, for these prior art CAE systems, the mapping of information from the visualization format to the original 3D CAD geometry is straightforward, since the former was directly created from the latter and both are available to the application.

However, in many circumstances (such as when the CAD model has been converted to an open format) the CAD geometry from which the visualization file is generated is not the same as the CAD model currently in use.

CAE analysis tools found in the prior art can be split into two categories:
1. Boundary conditions and/or other settings are added to the mesh
2. Settings are added to the CAD model In the first category, the CAD model is used to generate a high resolution mesh (with a resolution good enough for analysis). Then settings are added to this mesh, hence CAD data is not needed for adding settings. However, in this scenario, the mesh needs to be accurate (very high resolution) which means the computer carrying out pre-processing needs to have a very large memory and a powerful CPU to be able to read it.

In the second category, (corresponding to FIG. 1) the software tool can open a CAD model and settings are added by selecting the relevant points/edges/faces from the model. In general, a light-weight mesh is internally generated for visualization purposes (i.e., triangulation for 3D rendering) and this is actually what is being seen by the user. The computational mesh is generated after this process and the mapping between the selected CAD entities and the corresponding mesh entities is automatically made. Here, however, this is possible only because the software has all the required information at its disposal. Again, in this case the computer used for pre-processing needs to be powerful enough to be able to handle complex CAD models.

It is desirable to allow boundary conditions and other conditions to be set on a user computer, even when the user computer does not have the computing functionality to access a full CAD model. Moreover, it is desirable to be able to map CAE settings such as boundary conditions from the kind of visualization data which can be accessed on the less powerful local computer to a full CAD model on a more powerful computer which can perform analysis, even if visualization data on the local computer has not been directly derived from the CAD model which is used for analysis on the more powerful computer.

SUMMARY

Additional aspects and/or advantages will be set forth in part in the description which follows and, in part, will be apparent from the description, or may be learned by practice of the invention.

According to an embodiment of a first aspect of the invention there is provided a method of translating a Computer Aided Design CAD model of a product constructed for Computer Aided Engineering CAE analysis into a flexible form, the method comprising: converting the original CAD model into a different format to provide a new-format CAD model; providing visualization data including: an assembly tree extracted from the original CAD model, the assembly tree including each component of the assembly forming the product; and visualization information from the original CAD model for each assembly face in the assembly tree; and providing geometry information including matching information unambiguously identifying each assembly face; wherein the geometry information allows the assembly faces to be matched with the CAD faces in the new-format CAD model.

In methods according to this first embodiment, an original CAD model is available, for example in a proprietary format and is converted into another format such as an open standard (for example IGES or STEP). Although there are many advantages of conversion to an open format and sometimes conversion to a new format that is different from the old format is essential (for example when software becomes obsolete) there is a difficulty in that the faces of the original CAD model and of the new-format CAD model may not correspond. However, it is preferable to create visualization data from the original model, in case information is lost during conversion to the different format. The new-format CAD model, visualization data and geometry information may be created at the same time, or in any suitable order.

Embodiments of this aspect of the invention allow matching of faces between visualization data created from the original CAD model and faces in the new-format CAD model.

Current CAE systems can only map information from the visualization geometry to the full 3D CAD data in the case when the visualization data was internally created from the 3D CAD data. Invention embodiments overcome this limitation and make possible the mapping of such information when the two types of data are not necessarily available at the same time and when the visualization data was not created from the full 3D CAD data (i.e., when the full 3D CAD data is in a different format to the original CAD data from which the visualization geometry was created).

The inventors have come to the realization that, while for most current CAE systems both mesh generation and setting of analysis information are carried out on the client machine, future CAE systems will need to offload not only the solver but also the mesh generation stage to the cloud system. With growing model sizes, mesh generation is rapidly becoming one of most time consuming operations in CAE, hence moving it to the more powerful cloud system may become necessary in order to decrease the analysis time. However, such a move is not always possible using the current technology, as the full 3D CAD data used for analysis and the visualization data may not come from the same source. The pre-processing tool used for setting boundary conditions may not have any link to the full 3D CAD data, while the mesh generation tool may have no link to the visualization data used to set the boundary conditions and other such information. Invention embodiments can be used to map the assigned information from the visualization data to the full 3D CAD data, when the two pieces of data are no longer directly connected and have possibly been created from different sources.

Invention embodiments can have many advantages. For example, storage of CAD data is facilitated. After the analysis is performed, it is desirable to archive the result files for future reference. However, doing this is not efficient as the size of the result data is commonly 10×-1000× larger than the input files. Hence, instead of archiving the result files themselves, it is customary to archive pictures (i.e. screenshots) of the results together with the input files used for performing the analysis. This practice is no longer necessary with invention embodiments, which allow for changes in format.

There is a risk associated with long term storage of input analysis data in a proprietary CAD format, which lies in the lack of control the user has on the future of that format and associated software. It is possible that after a certain amount of time has passed, the vendor is no longer in business or the current version of the software is no longer compatible with the legacy data. It is therefore preferable to store the full 3D CAD data into a different, preferably open format, like the STEP format. Current technology allows this, however the link with the visualization data used to set analysis conditions is now lost. To overcome this, invention embodiments can be used to allow mapping between the visualization data and new-format CAD model.

Finally, in a CAE system using technology currently available, the full 3D CAD data must be available on the client machine in order for the analysis to be possible. When the user is not the owner of the 3D CAD data, this raises data protection issues, as the owner must fully trust the user to use this data only for the agreed purpose. From this perspective, invention embodiments are more secure, as the client does not need access to the full 3D CAD data but only to the visualization data. Thus, invention embodiments can provide a way of restricting access to the full 3D CAD data.

Use of the methodology in invention embodiments allows creation of a single flexible form from an original CAD model. The flexible form may include a new-format CAD model, visualization data and geometry information as mentioned hereinbefore. However, not all components of the flexible form need be available to a single computer. Thus, some components may be stored at a user computer (such as a local terminal with the usual limits on processing power) and other components may be provided only at a cloud computer (for example a more powerful networked computing system).

In an embodiment of a second aspect of the invention there is provided a user computer method of a user setting conditions for Computer Aided Engineering CAE analysis of an original Computer Aided Design CAD model of a product converted into a new format, wherein the method includes: downloading visualization data to a user computer, the visualization data including an assembly tree extracted from the original CAD model, the assembly tree including each component of the assembly forming the product, and visualization information from the original CAD model for each assembly face in the assembly tree; the user computer displaying the visualization data; the user adding CAE settings using the assembly faces in the visualization data; and the CAE settings being transferred to a cloud computer for mapping onto the new-format CAD model, without the new-format CAD model being available to the user computer.

Hence, the user of the local software has access to visualization data and can add CAE settings to the visualization data using the assembly faces. The CAE settings can be transferred to a cloud computer for analysis. There is no need for the user computer to download or store the new-format CAD model because geometry information stored in the cloud can allow the CAE settings for the assembly faces to be subsequently matched to the corresponding CAD faces in the new-format CAD model. Thus analysis is provided based on the CAE settings made locally, but without the new-format CAD model being available locally.

Correspondingly, there is no need for the visualization data in the cloud. According to an aspect of a further embodiment of the invention there is provided a cloud computer method of preparing for Computer Aided Engineering CAE analysis of a Computer Aided Design CAD model of a product converted into a new format, wherein the method comprises: the cloud computer storing a new-format CAD model converted from the original CAD model and geometry information including matching information identifying each assembly face of an assembly tree extracted from the original CAD model, the assembly tree including each component of the assembly forming the product; the cloud computer receiving CAE settings entered using visualization data and referring to the assembly faces; the cloud computer matching the assembly faces to the corresponding CAD faces in the new-format CAD model using the geometry information; and the cloud computer mapping (transferring) the CAE settings to the corresponding CAD faces in the new-format CAD model.

The cloud computer stores the new-format CAD model and the geometry information. Hence, when the cloud computer receives CAE settings which were entered on visualization data it can link them to the CAD faces in the new-format CAD model by mapping the CAE setting information onto the CAD faces using matching information.

Methods according to the first aspect of the invention may be carried out by a creator of the flexible form model. Methods according to the second aspect may be carried out by a user such as a CAE expert using pre-processing software to set up a simulation. Methods according to the third aspect may be carried out automatically and/or with manual input to run a solver and carry out the analysis. Once the cloud computer has carried out CAE using the new-format CAD model, it can map the results from the CAD faces to the assembly faces for display on visualization data which is available to a local user of a less powerful user computer.

In invention embodiments, geometry information includes matching information unambiguously identifying each assembly face (the assembly faces being the same in both the visualization data and in the geometry information). Further information may also be included in the geometry information in order to assist in mapping settings and results between the new-format CAD model faces and the assembly faces of the visualization.

In one embodiment, further information is generated in the form of face markers. The face markers may be generated by reading data from the original CAD model. This data can be used for the corresponding faces of the new-format CAD model and the geometry information, so that corresponding faces have the same marker. Hence the new-format CAD model can include new-format face markers for the CAD faces of the new-format CAD model and the geometry information may include corresponding assembly face markers for the assembly faces. The markers may be any way of marking a face, such as a color value, transparency value or even simply a number, letter or symbol. The face markers need not unambiguously mark each face (the same marker can be used for more than one face of a model), but can be used as a first step of matching to limit the searching when a matching process is being carried out.

The information used in the matching process is any that can unambiguously identify each assembly face. For example, matching information could comprise any suitable number of points on that face or points on the edges of that face or both. Preferably, the matching information for each assembly face includes at least one loop marker in the form of at least three points on the loop of that face. This is a compact form of matching information. Of course for more complex faces, such as for a face including a hole or particular profile, more than one loop marker will be required.

The face markers and matching information may be used in combination so that the new-format face markers and assembly face markers are compared first to reduce the possible matches before a final match between assembly faces and CAD faces is made using the matching information.

Both the visualization data and the geometry information include the same assembly faces. These faces may be labeled. Any appropriate labeling can be used, and preferred embodiments envisage a face ID for each assembly face being stored as part of the visualization data and as part of the geometry information. The CAD faces (of the new-format CAD model) may then be labeled with the face ID once a match has taken place.

Turning now to the CAE steps, the CAE settings can include any user settings for modeling, such as boundary information for CAE analysis. The CAE analysis may include a mesh generation process and a solving process.

As explained hereinbefore, a mesh generation process and a solving process may be carried out using the new-format CAD model in a cloud environment and input of CAE settings may be carried out using a simpler visualization model on a user computer.

The visualization data includes an assembly tree and visualization information from the original CAD model for each face in the assembly tree. It should be noted that the term "assembly tree" is to be interpreted broadly in this context as any structure which includes an identification of the components of the assembly and a parent/child relationship in the assembly.

The visualization information may include triangulation data, and may give a simplified form of the product model, for example by use of a discretized version of the analytical model in the original CAD model.

Invention embodiments extend to apparatus embodiments. In an embodiment of a first apparatus aspect of the invention, there is provided a computer apparatus operable to translate a Computer Aided Design CAD model of a product constructed for Computer Aided Engineering CAE analysis into a flexible form, the apparatus comprising: a converter operable to: convert the original CAD model into an different format to provide a new-format CAD model; extract an assembly tree from the original CAD model, the assembly tree including each component of the assembly forming the product; provide visualization data including the assembly tree and visualization information from the original CAD model for each assembly face in the assembly tree; and to provide geometry information including matching information unambiguously identifying each assembly face; wherein the matching information allows the assembly faces to be matched with the CAD faces in the new-format CAD model.

This embodiment relates to the creation of the flexible form CAD model including the new-format CAD model, assembly tree, visualization information, and geometry information. The creation is likely to be carried out on the cloud and using appropriate converter software, executed on a server or group of servers, for example.

Embodiments of a second apparatus aspect of invention provide a user computer operable to allow a user to set conditions for Computer Aided Engineering CAE analysis of a Computer Aided Design CAD model of a product converted into a new format, wherein the user computer comprises includes: an input (such as an internet connection, or internal or external drive) operable to read visualization data including an assembly tree extracted from the original CAD model, the assembly tree including each component of the assembly forming the product, and visualization information from the original CAD model for each assembly face in the assembly tree; a display (such as a VDU and/or printer) operable to display the visualization data; a user interface (such as a keyboard and mouse) operable to allow the user to add CAE settings using the assembly faces in the visualization data; and an output (such as an internet connection, or internal or external drive) operable to transfer the CAE settings to a cloud computer for analysis, without the new-format CAD model being available to the user computer.

This apparatus definition relates to a local computer such as a terminal on which visualization data of the flexible form CAD model may be available.

Embodiments of a third apparatus aspect of invention provide a cloud computer operable to prepare for Computer Aided Engineering CAE analysis of a Computer Aided Design CAD model of a product converted into a new format, wherein the cloud computer comprises: memory arranged to store a new-format CAD model converted from an original CAD model and arranged to store geometry information including matching information identifying each assembly face of an assembly tree extracted from the original CAD model, the assembly tree including each component of the assembly forming the product; an input operable to receive CAE settings entered using visualization data and referring to the assembly faces; a matcher operable to match the assembly faces to the corresponding CAD faces in the new-format CAD model using the geometry information; and a transferer operable to transfer the CAE settings to the corresponding CAD faces in the new-format CAD model.

The memory and matcher may be provided as storage and processing capability and the input and transferer may be network links.

According to a further general program aspect there is provided a program which when loaded onto a computing apparatus such as a distributed computer system or local terminal configures the computing apparatus to carry out the method steps according to any of the preceding method definitions or any combination thereof.

Features and sub features of any of the different aspects of the invention may be freely combined. For example, preferred embodiments of the computer or computer apparatus may be configured to incorporate functionality corresponding to one or more preferred features of the methods.

The invention can be implemented in computer hardware, firmware, software, or in combinations of them. Embodiments can be implemented as a computer program or computer program product, i.e., a computer program tangibly embodied in an information carrier, e.g., in a non-transitory machine-readable storage device or in a propagated signal, for execution by, or to control the operation of, one or more hardware modules.

A computer program can be in the form of a computer program portion or more than one computer program and can be written in any form of programming language, including compiled or interpreted languages, and it can be deployed in any form, including as a library, stand-alone program or as a module, component, subroutine, or other unit suitable for use in a data processing environment.

Method steps of the invention can be performed by programmable processors executing a computer program to perform functions of the invention by operating on input data and generating output.

The invention is described in terms of particular embodiments. Other embodiments are within the scope of the following claims. For example, the steps of the invention can be performed in a different order and still achieve desirable results.

The apparatus according to preferred embodiments is described as configured, operable or arranged to carry out certain functions. This configuration or arrangement could be by use of hardware or middleware or any other suitable system. In preferred embodiments, the configuration or arrangement is by software.

BRIEF DESCRIPTION OF THE DRAWINGS

These and/or other aspects and advantages will become apparent and more readily appreciated from the following description of the embodiments, taken in conjunction with the accompanying drawings of which:

FIG. 1 is a schematic diagram showing the layout of current CAE systems that use the cloud;

FIG. 2 is a schematic diagram of a next generation cloud-enabled CAE system according to invention embodiments;

FIG. 9 is a pictorial representation of flexible 3D CAD data according to invention embodiments;

FIG. 10 is a flow diagram of the conversion process creating the flexible form CAD data from the original 3D CAD data;

FIG. 20 is an example of a part of a file showing geometry information for a part; and FIG. 21 is part of a file attaching boundary conditions to face IDs.

DETAILED DESCRIPTION

Figure 3:
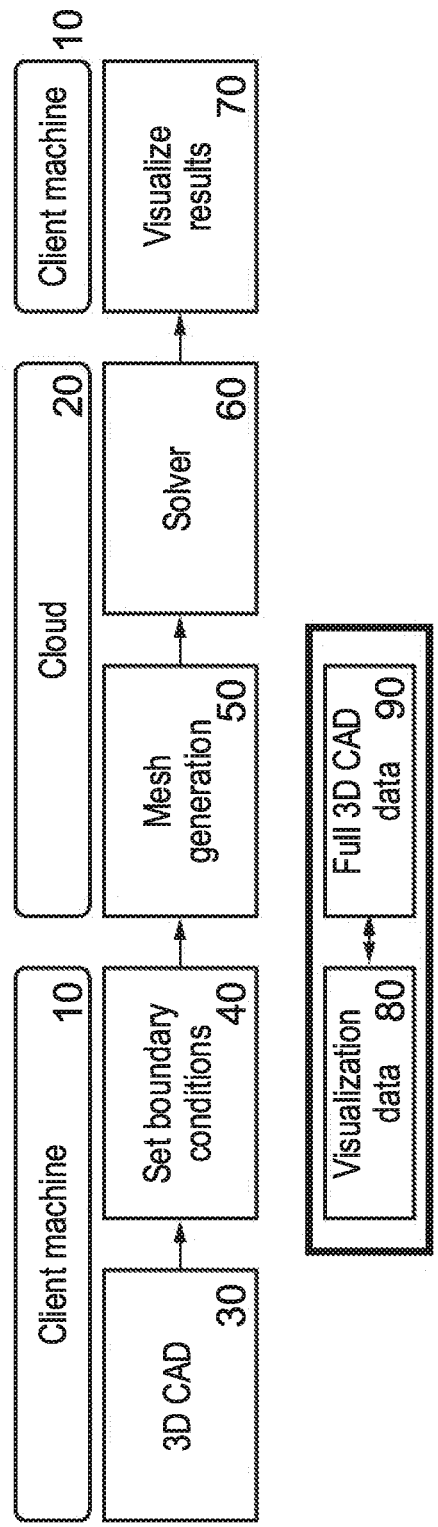
FIG. 3 is a schematic diagram of a next generation cloud-enabled CAE system showing data transfer.

Reference will now be made in detail to the embodiments, examples of which are illustrated in the accompanying drawings, wherein like reference numerals refer to the like elements throughout. The embodiments are described below to explain the present invention by referring to the figures.

FIG. 2 is a depiction of the next generation cloud-enabled CAE system according to invention embodiments, which uses the same numbering as FIG. 1 to identify the same components. In contrast to the prior art shown in FIG. 1, the cloud computer 20 is used for mesh generation 50 as well as for the solver 60. The CAE setting input steps take place on the client machine. Data used to provide settings for analysis on the client machine is also used for visualization of the results.

FIG. 3 shows the same diagram supplemented with the exchange of data between the client machine and the cloud machine for setting the boundary conditions and transferring them onto the mesh. The client machine uses visualization data 80 and the mesh generation process uses full 3D CAD data 90. The transfer of data between these two formats is a key element in invention embodiments.

Figure 4:
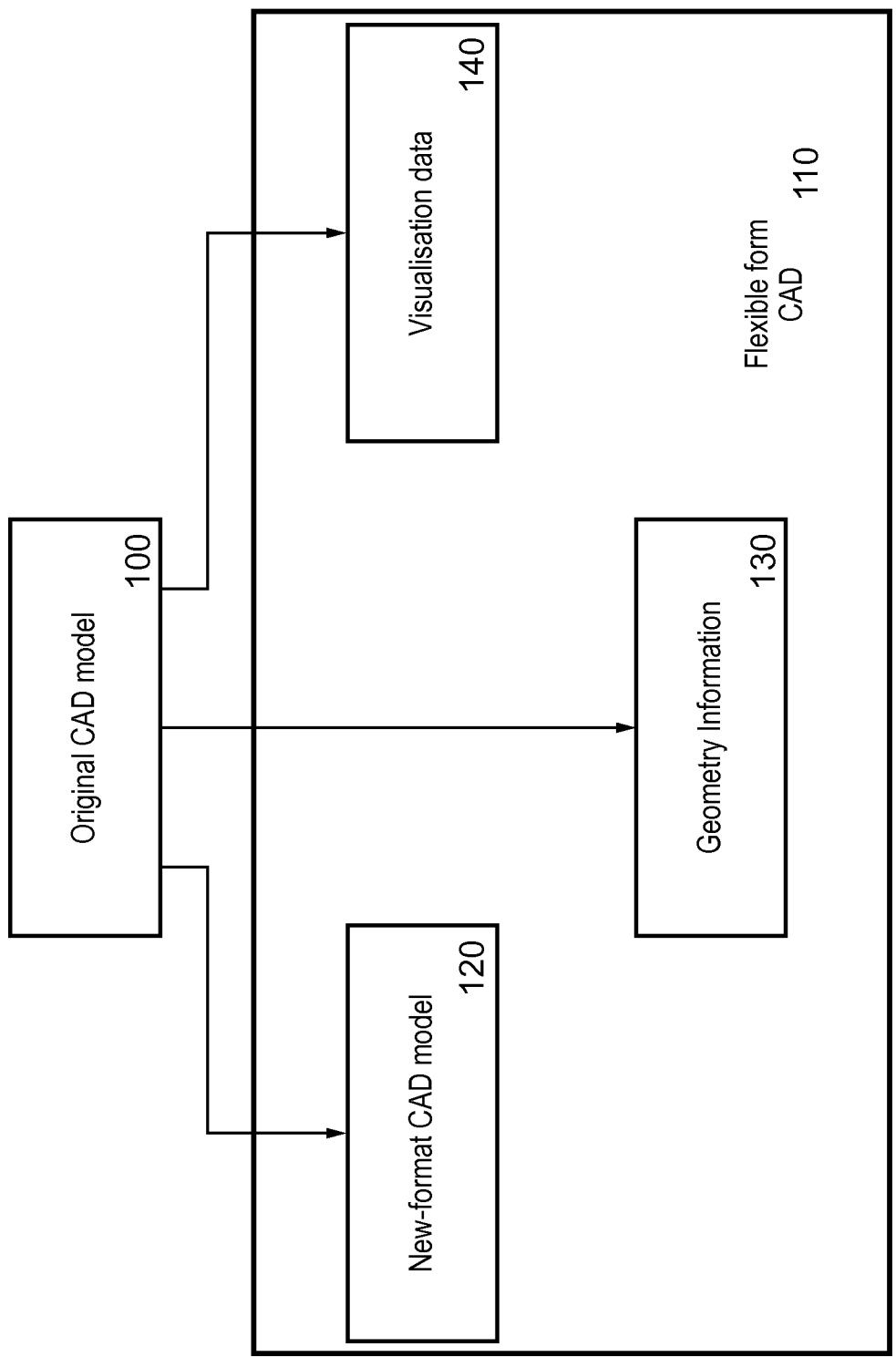
FIG. 4 is a flow diagram of a translation method of invention embodiments.

FIG. 4 is a schematic diagram of conversion into a flexible CAD form according to invention embodiments. An original CAD model 100 (which could be in a proprietary format or in an open format, or in any other format) is converted into a new-format CAD model 120 (which equally could be in any format, but is most likely to be in an open format), visualization data 140 and geometry information 130. The geometry information is used to match the visualization data, which is created from the original model, to the new-format CAD model. The new-format CAD model, visualization data and geometry information together make up the flexible-form CAD data 110. Subsequently, the various parts of the flexible form may be stored separately, but the new-format CAD model and visualization data can always be linked using the geometry information.

Figure 5:
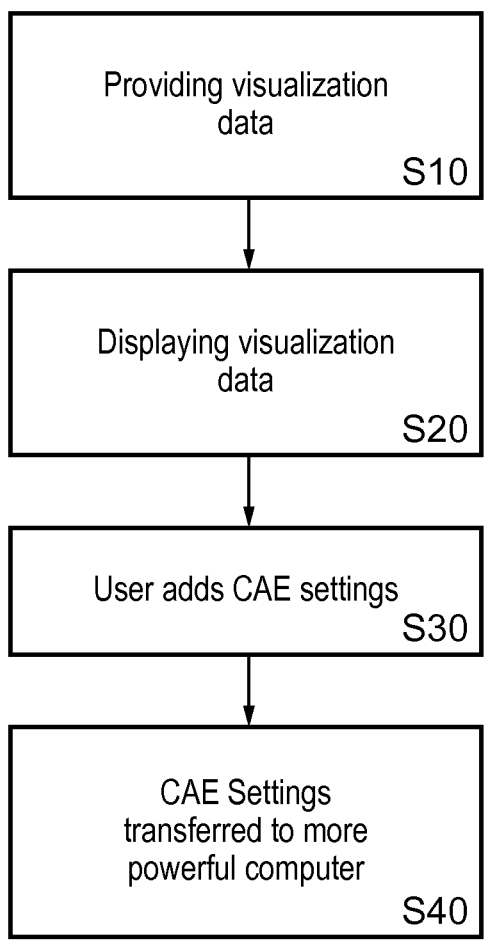
FIG. 5 is a flow diagram of a condition setting method of invention embodiments.

FIG. 5 is a schematic flow diagram of providing CAE settings at a user terminal. In step S10, visualization data is provided (for example downloaded or available from local storage). In step S20, visualization data is displayed to the user. In step S30, the user adds CAE settings, such as boundary conditions, on the basis of the visualization data displayed. For example the user may add a temperature, load or external fluid flow condition at one assembly face of the visualization data. In step S40, the CAE settings are transferred to a more powerful computer. The position of settings added to the visualization data can be mapped to the faces of a full CAD model on the more powerful computer, using geometry information which has the same topology as the visualization data and thus includes the same assembly faces, labeled/identified in the same way as those in the visualization data.

Figure 6:
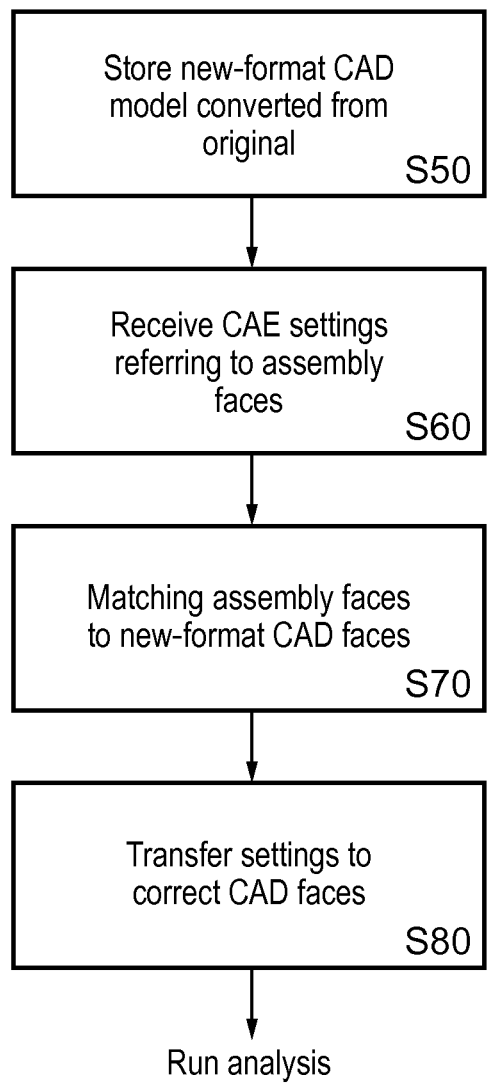
FIG. 6 is a flow diagram of a method of preparing for CAE analysis of invention embodiments.

FIG. 6 is another schematic flow diagram, illustrating a process of preparing for CAE analysis. In step S50 a new-format CAD model is provided. In step S60, CAE settings referring to assembly faces are received (for example from a user terminal). In step S70, the assembly faces are matched to the new-format CAD faces. Finally, in step S80, settings are mapped to the correct CAD faces. Thereafter, the analysis can be carried out.

Figure 7:
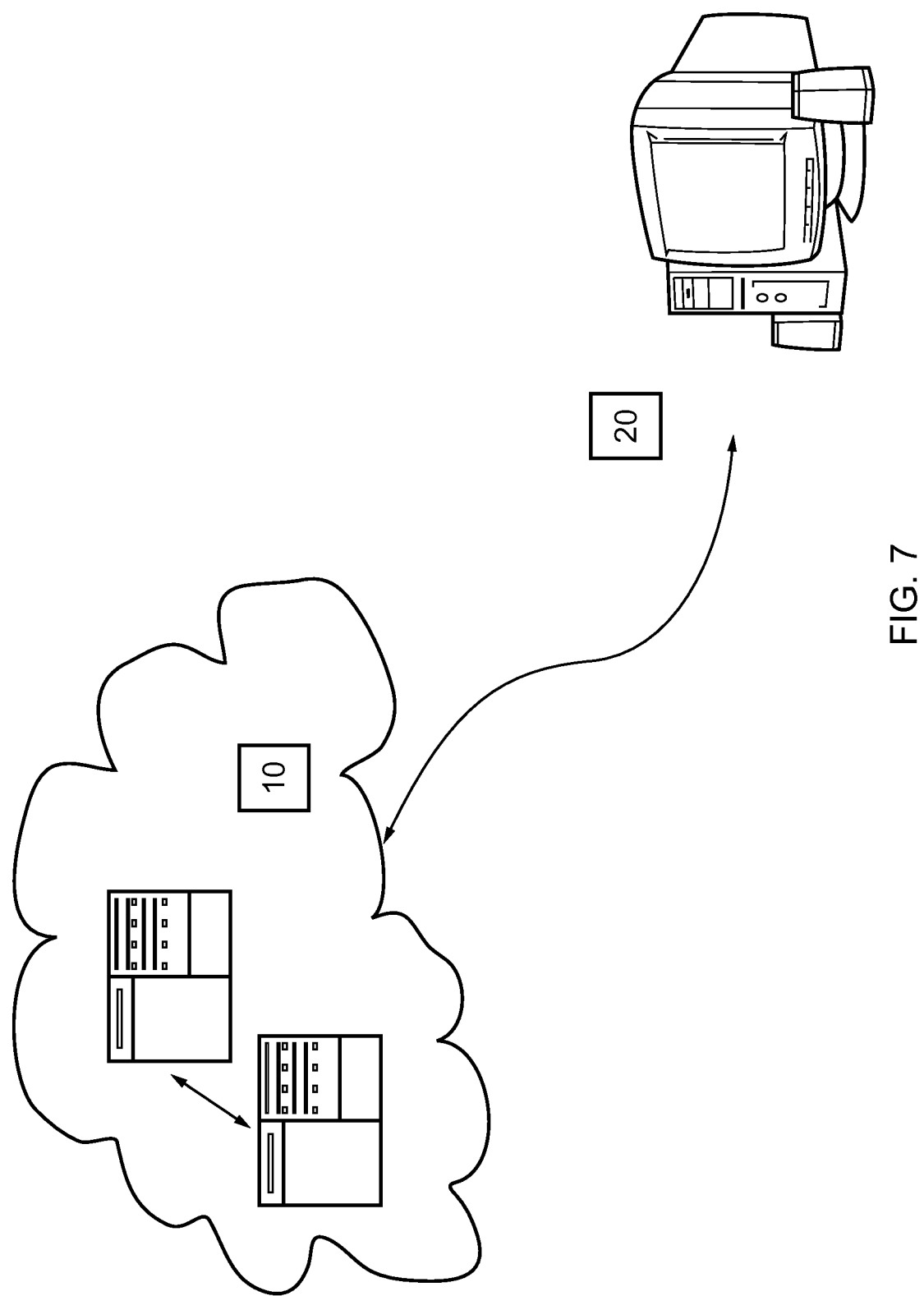
FIG. 7 is a schematic diagram showing a user computer and a cloud computer used in invention embodiments.

FIG. 7 is an overview diagram showing a local computer/ user terminal 10 and a link to a cloud computer 20, which is represented as linked servers. The local computer and cloud computer may be linked over a public network, such as the internet, or over a private network, for example within a firm.

Figure 8:
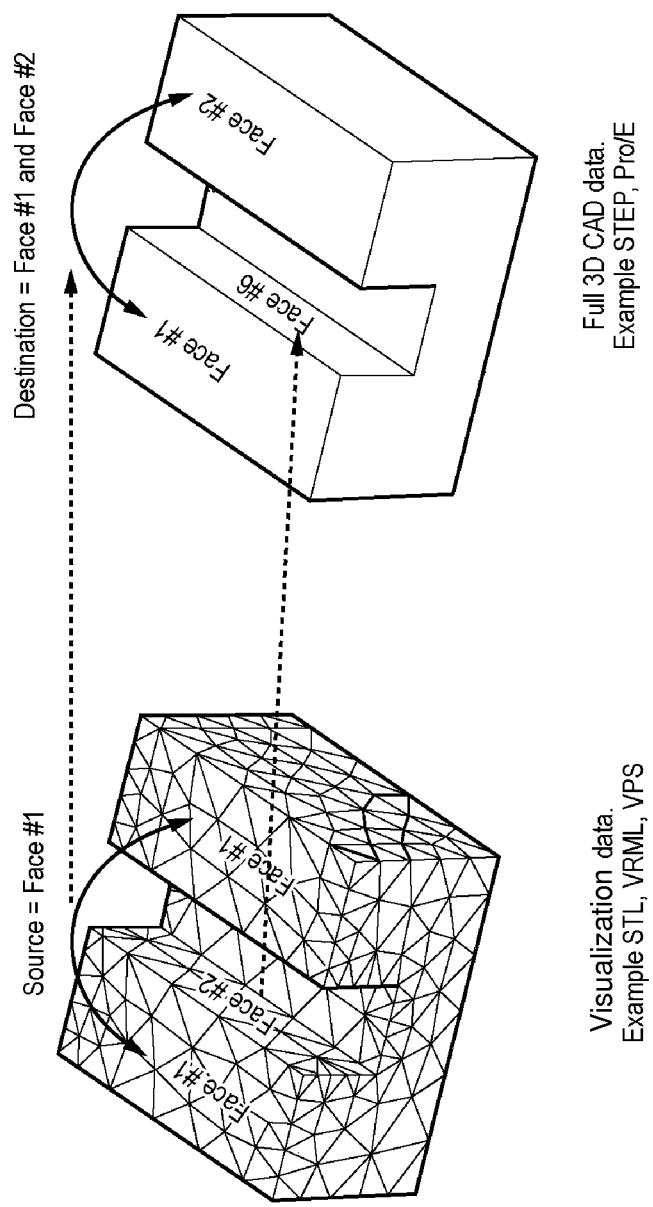
FIG. 8 is a schematic diagram showing how data is mapped between different geometry formats according to invention embodiments.

FIG. 8 indicates the difficulty in mapping data between different geometry formats.

The main challenge with mapping data in such a general setting is that topology of the two model representations can be different. If the visualization data has not been created directly from the full 3D CAD data, the faces, edges and vertices and their order (of definition) are likely to be different. FIG. 8 shows a solid part as drawn using the full CAD data to the right and visualization data to the left. In the two formats, the faces are numbered differently. Thus Face #1 from the visualization data corresponds to the combination of Face #1 and Face #2 from the 3D CAD data. In such case a one-to-one mapping of information is not possible and, in general, a many-to-many type of mapping will be required.

Embodiments of the current invention allow creation of a next generation cloud-enabled CAE analysis system such as the one shown in FIG. 2. In this system: Efficient GUI-based interaction with the user is via a light-weight, less accurate geometry format for visualization Mesh generation and solving is carried out on a cloud system, using an accurate 3D CAD geometry format This is made possible by the innovative way of mapping the user defined data from the light-weight geometry format for visualization on the client computer to the full 3D CAD data on the cloud system.

Invention embodiments propose the creation and use of a "Flexible CAD format". A preferred flexible CAD format is shown in more detail in FIG. 9. It is created starting from the original 3D CAD data. It contains three main pieces of information that will be described in detail in the following sections:

3D CAD data stored in STEP format with additional markers (e.g. colour information or transparency information) that is attached to faces.

Description of the geometry containing the assembly tree with additional information to describe the loop/loops that bound faces in the model (e.g. coordinates of points on the edges of the loop). Each face is also associated a face ID.

Visualization data stored in a light-weight format (e.g. a faceted format like STL or VRML) augmented with face IDs Note that while the STEP format is used here as the reference format, it would theoretically be possible to use another CAD format for this purpose. However, in order to keep the explanation simple, the STEP format will be used throughout the following examples.

Face and loop markers provide the correspondence between the STEP data and geometry description. The use of loop markers creates an unambiguous one-to-one correspondence between faces in the 3D STEP file and face IDs in the geometry description. This correspondence is then carried via face IDs to the visualization data. In this way, information such as boundary conditions attached to specific face IDs on a client computer can be mapped to the corresponding faces in the 3D STEP file used on the cloud system.

The pre processing software that the user uses to set the boundary conditions has the map between faces and face IDs, therefore it can always know the ID of the face that the user has selected when setting the boundary condition. The software need not know about loop information, it needs only to associate the face selected by the user with its ID.

One key idea of using loop information is that this is invariant to change of format. Even after the order of faces has changed and faces have been split or combined, as long as loop information is available, the correspondence is available.

The creation of the flexible CAD format is briefly described in FIG. 10.

The process starts with original 3D CAD data 100. The data is used in three different ways. Firstly, the original 3D CAD data is used for conversion to STEP format, to which face markers are added. Secondly, the original 3D CAD data 100 is used to create geometry description data 130 including loop markers, face IDs and face markers. Thirdly, the original 3D CAD data 100 is used to create visualization data 140 with face IDs. These three conversions can be carried out at least partially in parallel.

The face markers are added to the same faces in the STEP format and in the geometry description irrespective of the particular topology/numbering system for faces used in the STEP format and in the geometry description data. For example, color (or other marker) information may be first added to the original CAD data. Then the original CAD data is converted to the new CAD format (e.g. STEP). During this conversion, the topology may change, for example one face could be split into two faces. However, the converter will keep the color information; therefore the two faces that are created will have the color that was assigned to the original face. In parallel, the geometry description can be created from the original CAD data and the color information that was added to each face is thus recorded here as well.

The face markers may be generated from original face IDs, for example as in the original CAD model. Moreover, the same face IDs may be used in the geometry description data and in the visualization data. Retaining the face IDs from the original CAD model is advantageous because it can allow the user to see visualization data which has the same structure as the original model when providing boundary conditions and simulation settings.

In invention embodiments reflecting the next-generation CAE system described in FIG. 10, the visualization data from the flexible CAD data is used on the client computer to set boundary conditions and other relevant information. Subsequently, these settings are sent to the cloud platform where mesh generation uses the STEP data. After meshing has been completed and just before the solver stage, the geometry description is used to transfer the settings on the visualization data to the 3D model created from the STEP data.

Figure 11:
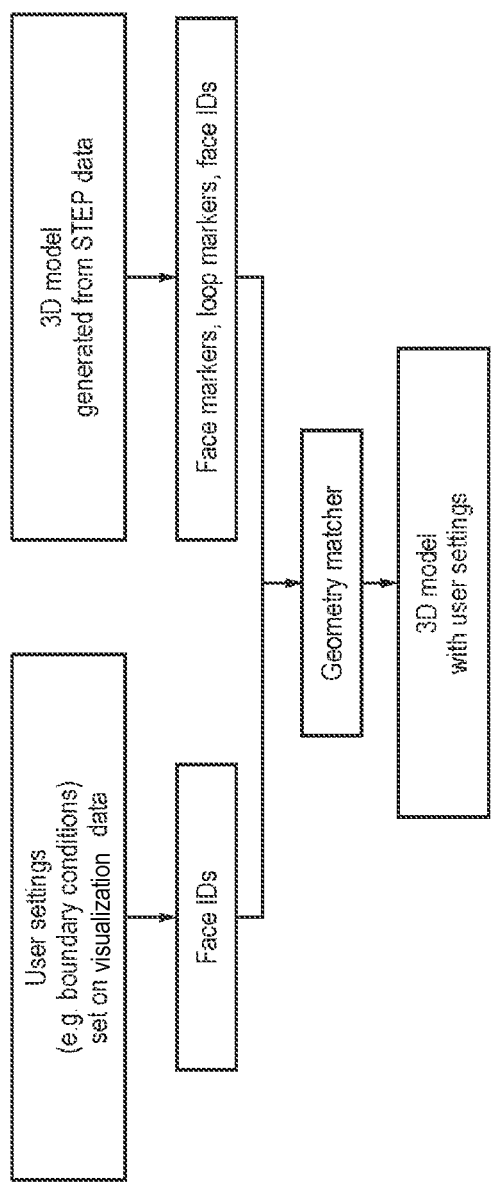
FIG. 11 is a schematic diagram showing mapping of information according to invention embodiments.

FIG. 11 shows the mapping of information from visualization geometry to the STEP geometry. The key to this process is the geometry matcher module. To the left of the figure, user settings are set on visualization data, which includes face IDs and is provided for geometry matching. In general, the STEP model face IDs are different from those in the visualization data. To the right hand of the diagram, there is the 3D model generated from STEP data. The face markers, loop markers and face IDs of the geometry description are used along with the STEP model and user settings with their face IDs for geometry matching. In the matching process, the CAD faces in the STEP model can be matched to the assembly faces on the visualization data using the face markers and loop markers. At that stage, the face IDs from the visualization data can be mapped to the appropriate faces of the STEP data and thus the 3D model can be provided with user settings.

The following more detailed description of a conversion process and mapping process give examples of two important phases in invention embodiments.

1. Conversion Process (From Original 3D CAD Data to Flexible 3D CAD Data)

a. Creating STEP Data with Face Markers

Figure 12:
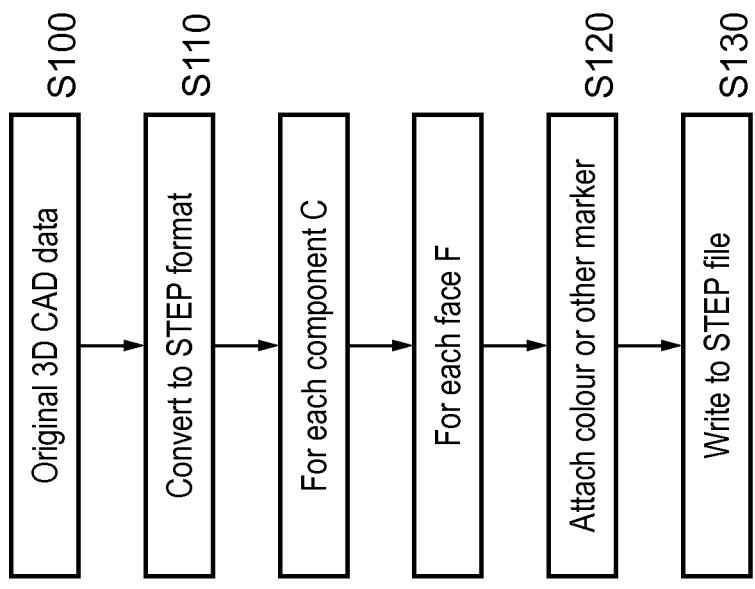
FIG. 12 is a flow chart showing the creation of step data with face markers.

In this step, the original 3D CAD data, which could be stored either in a proprietary CAD format like Pro/Engineer, ACIS, Parasolid but also in an open CAD format as STEP and IGES, is converted to STEP format and augmented with markers. The process is described in FIG. 12.

First, the original 3D CAD data is imported into the conversion tool in step S100. Thereafter, using functions already available in the CAD kernel being used, the original data is converted to STEP format in step S110. For each face of each assembly component in the original 3D CAD data, a marker, for example color or transparency value, is attached in step S120. The marker information is then written, together with the geometry, to file in step S130.

Figure 13:
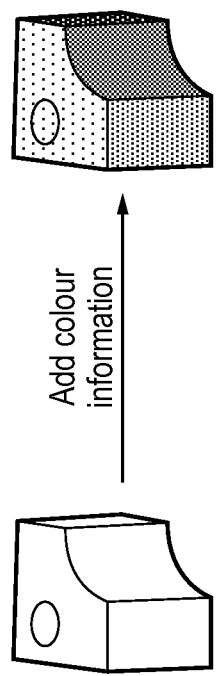
FIG. 13 shows the addition of color information as a face marker.

Note that while it is preferable for the marker to be unique to each face, it is also possible that several faces could share the same marker. Such an example is shown in FIG. 13, where the both faces on the top part of the geometry share the same color (shown as a darker grey). That is, the top face and the circular hole that appears as part of the top face in the diagrams are both the same color.

Face markers are used to reduce the search space when trying to establish the correspondence. When trying to match M faces found in the geometry description (that is, coming from the original CAD model) with N faces found in the STEP data, there are M×N possible combinations. If we use markers, we only try combinations of faces that have the same markers. For example, we only try to match faces with color 0x001122 from the geometry description with faces with color 0x001122 from the STEP file. This number of combinations will probably be orders of magnitude smaller than M×N.

For very small CAD models with very few faces, it is possible to search the entire space. However, for real models which have hundreds or thousands of faces, this search can be prohibitively long. Searching is significantly reduced and matching performed very efficiently by using markers.

b. Creating Assembly Data with Loop Markers

Figure 14:
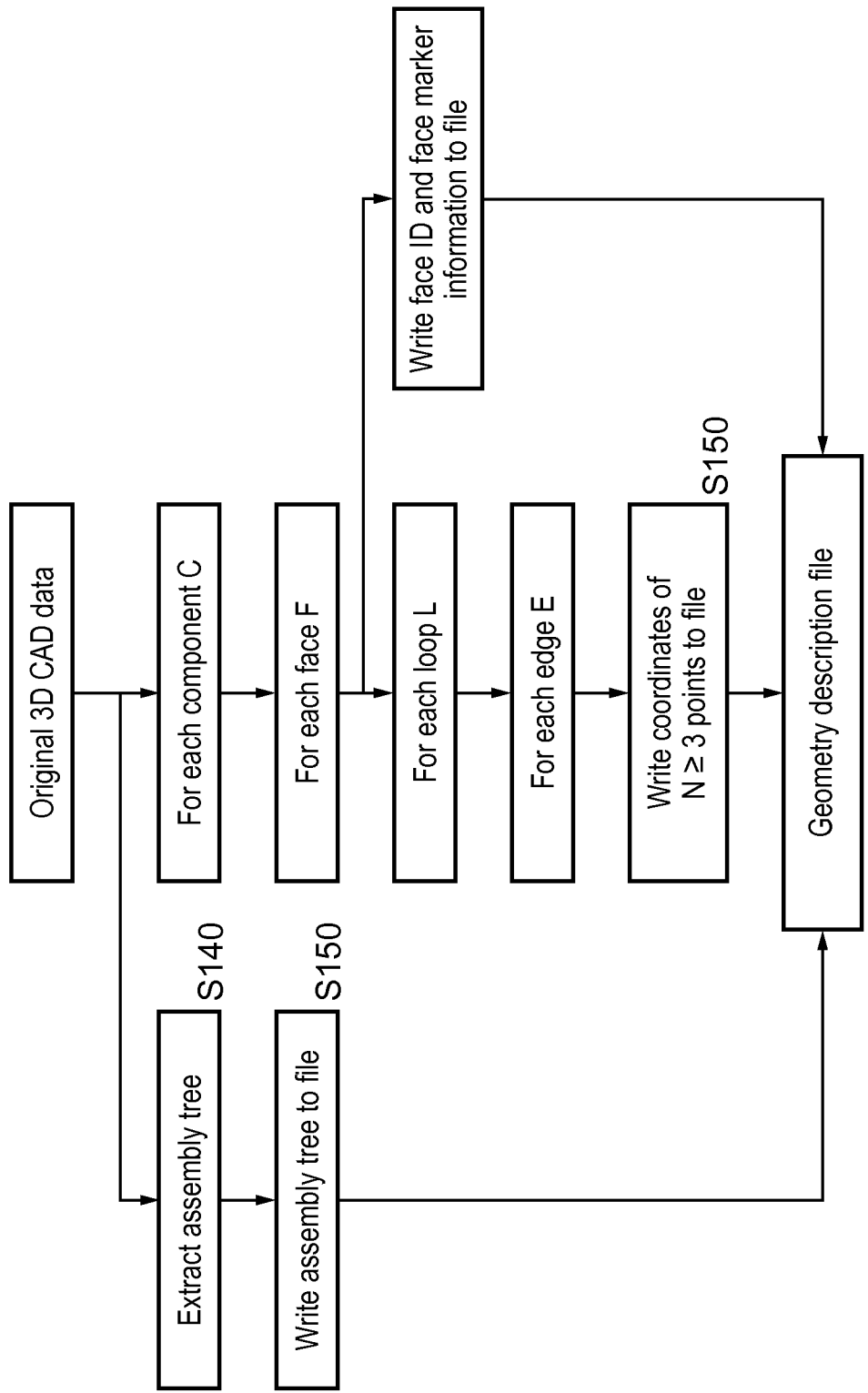
FIG. 14 is a flow chart showing the creation of the geometry description.

In this step we extract two pieces of information from the original 3D CAD data—the assembly tree and the loop information—and write them to file. This process is described in FIG. 14.

First, using functions provided by the CAD kernel being used, the assembly model is read S140 and the structure of the assembly tree is written to file, S150. Important information that needs to be written is the name of the parts and the parent-child relations. The reading of the assembly information is usually performed in a recursive way, starting from the root (also called the main assembly).

Figure 15:
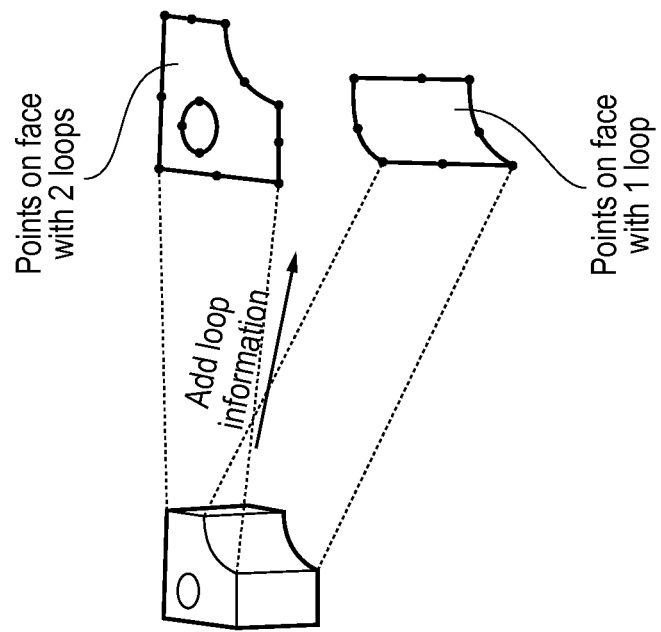
FIG. 15 shows an example of loop markers.

Next, for each face of each component of the assembly, and for each edge of each loop of that face, at least three points are generated and saved to file in step S160. Ideally the points should be placed sufficiently far apart along an edge, for example at the beginning, middle and end of the edge. FIG. 15 gives examples of such loop markers for two faces of the component shown in FIG. 13. Finally, a unique face ID is attached to the description of the geometry of each face in step S170.

Figure 16:
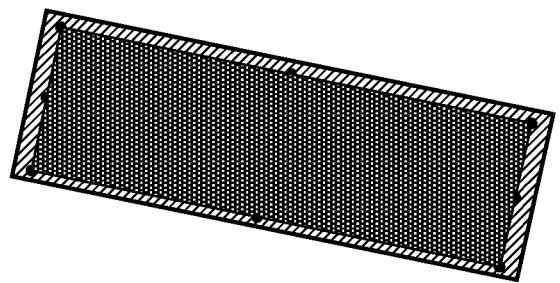
FIG. 16 shows a comparison of loop points and faces

FIG. 16 is a comparison of loop points and faces. There is a match between loop points and a face if all points in the loop fall on or very close to some of the face. In the FIG. 16 example, the loop points (black points) fall almost exactly on the edges of the darker face (interior face) but also very close to the edges of the paler face (exterior face). Since both sets of points are close enough, it is difficult to reject any of the faces. However, the darker face is chosen as the correct match since it is the closest.

In general, this kind of situation happens when dealing with very small faces.

2. Mapping Process

The goal of this process is use the markers in order to establish a one-to-one match between faces inside the STEP file and the face IDs used inside the geometry description file. This process is carried out once for each component of the assembly structure.

The first step in the matching process is to use the face marker information to narrow down the search. For each face marker (e.g., for each color value) the subset of faces inside the STEP file and the subset of face IDs inside the geometry description file which correspond to that marker are extracted into a set. In general, after this first step, the number of elements in each set is 10 elements or less. Actually, if the marker is unique for each face or if there is a very large number of markers available, the number of elements might actually be much smaller, for example 1 or 2.

Matching each face ID with one or more faces in the STEP file is a two-step process.

First, loop markers are used to reject unsuitable matches. For each face ID, the distance between the points stored in the attached geometry description to the contours (loops) defining the face in the STEP file is computed. If there exist points for which this distance is larger than a certain threshold (e.g., 1 mm) then that face is removed from the list of possible matches.

Figures 18, 19:
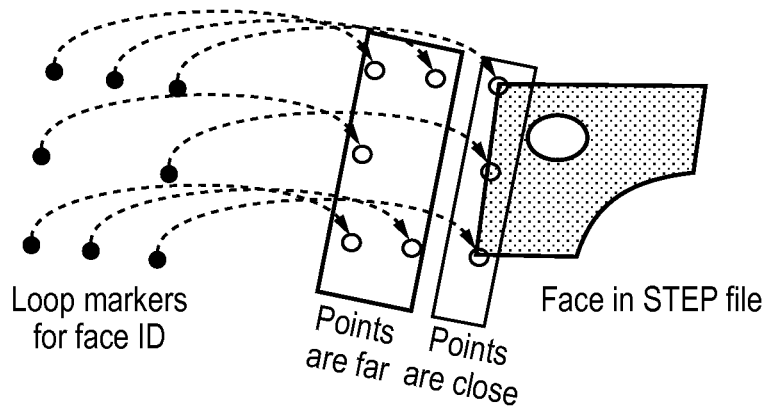
FIG. 18 is an example of candidates rejected during a geometry match.
FIG. 19 is an example of a file containing an assembly tree.

An example of such a rejection is shown in FIG. 18, where the face in the right is rejected from the list of possible matches for the face ID in the left.

After all the unsuitable faces have been rejected, action is taken based on the number of possible candidate faces in the STEP file. If there is only one possible candidate, then the matching is completed. If there is more than one candidate, then the one providing the best match will be chosen. If there is no candidate, an exception will be generated which must be handled by the application.

Figure 17:
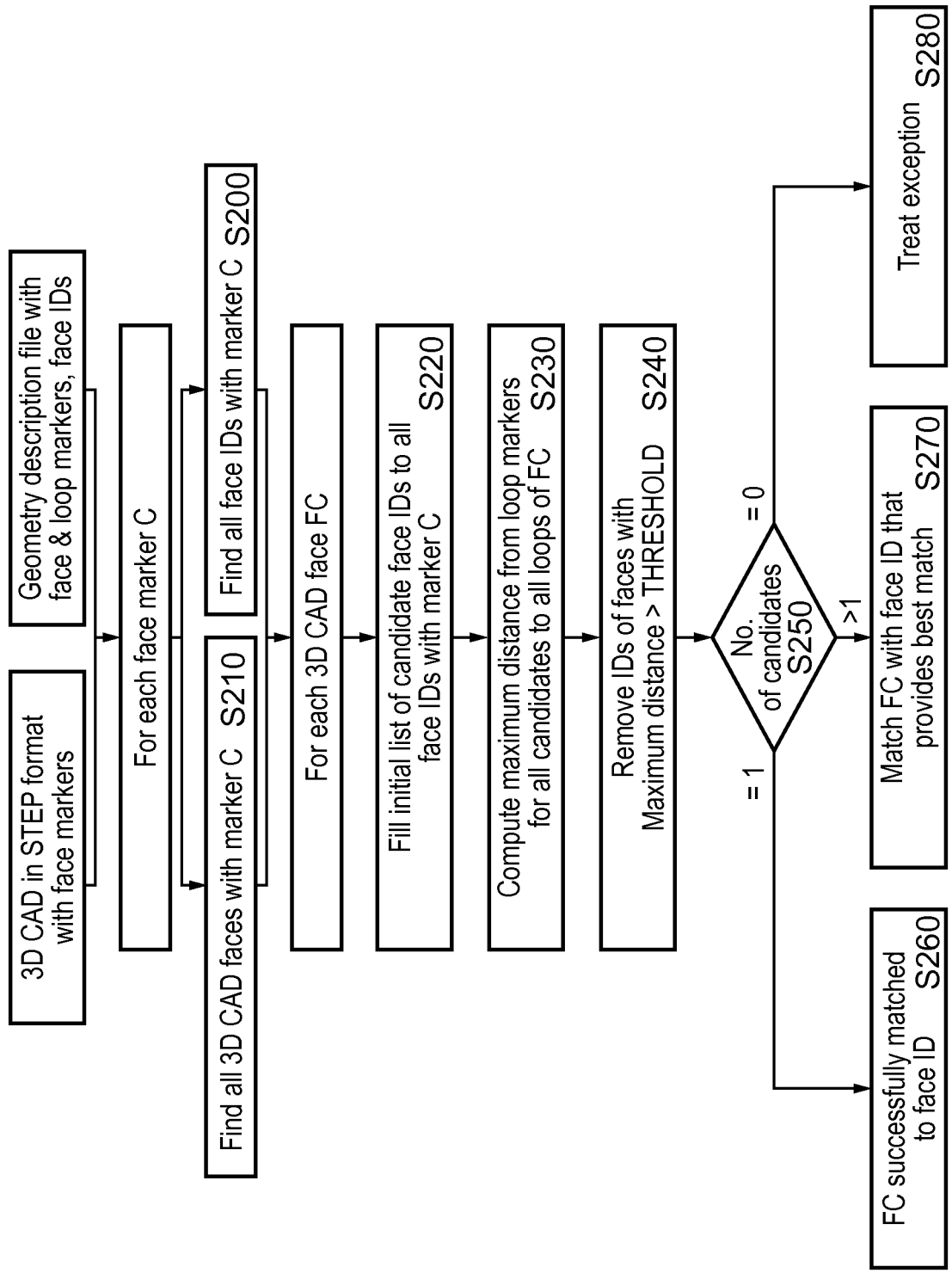
FIG. 17 is a flow chart showing the geometry matching process.

FIG. 17 is a flow diagram example of the mapping process. The STEP format 3D CAD file with face markers and geometry description file with face and loop markers and face IDs are compared for each face marker C. In step S200 all the CAD faces with marker C are found and in step S210 all the face IDs with marker C are found from the geometry description file. Then, for each STEP format face, an initial list of candidate face IDs with the correct marker C is found in step S220. In step S230 the 3D CAD faces with marker C are compared to the loop markers and a maximum distance from the loop markers for each CAD face is computed. In step S240 the face IDs are removed for geometry description faces having a maximum distance over threshold. At this stage there is an assessment of the number of candidates in step S250. If there is only one candidate face ID it is successfully matched to the 3D CAD face FC. If there is more than one candidate, the best match is found in step S270. If there are no candidates an exception is generated in step S280.

A Worked Example of Invention Embodiments

This example relates to the specific files used in some invention embodiments and details the functions in three steps:
  Original CAD to Flexible CAD conversion (made at some point prior to the analysis)
  Set boundary conditions (on the client computer)
  Mesh generation and analysis (in the cloud)

Step 1: Original CAD to Flexible CAD Conversion

CAD data is stored in the Pro/Engineer format. This is one of the widely used closed CAD formats. Some models, like a full laptop model, can be very large in size and can require lots of resources to open and manipulate. Moreover, Pro/E is a closed format, and thus not ideal for long term archiving purposes.

The first step uses a converter tool to convert data from Pro/E format to the "flexible CAD format", for example using a command like:
  PROEConverter.exe model.asm flex_cad
After the conversion, the flex_cad folder contains the following files:
a. flex_cad\model.stp
b. flex_cad\model.dmu
c. flex_cad\shapes\part1.slb
d. flex_cad\shapes\part2.slb
e. flex_cad\model.comp
From the above:
  a) stores the full CAD model, but in STEP format, which is open, as opposed to Pro/E format which is proprietary. In this STEP file, all faces have been assigned color Information (face markers).
  b, c, d) store the triangulated geometry, used for visualization. In particular, b. contains the assembly tree information and c, d) contain the triangulation for all faces for part1 and part2, respectively. Moreover, for each face, besides triangulation, a face ID is stored. These are what we call the "visualization data".
  e) stores the geometry description data, that is, extra information that we need for the matching. In this implementation we use color information (face markers) and loop information (loop markers).

What was previously a Pro/E file has now become a collection of three pieces of information; full CAD data (a), visualization data (b, c, d) and extra information for matching (e).

The actual conversion is usually carried out at some prior time which is not related to the actual analysis. Of course, it could also be done just before analysis.

After this conversion the original CAD model (the Pro/E model) is no longer required.

Step 2: CAD: Setting Boundary Conditions

In this second stage, a CAE expert (in general not the creator of the CAD model) uses pre-processing software to set up a simulation. This software only reads the visualization information, that is (b, c, d) from the example above. The other two files, (a, e) are not needed. Note that the visualization information contains face IDs (these are stored inside c, d).

All the simulation set-up work uses this light-weight geometry, in general on a desktop computer, which may not be particularly powerful.

After the user has finished setting up the model, simulation settings such as boundary conditions are saved as a separate text file
f. ftex_cad\model.fcnt This file will specify, for example, that a pressure of 1 MPa is set on face with ID "35" belonging to solid "part1". This is the reason why IDs attached to the faces are provided, because we need to save this information for later use.

Step 3: CAD Mesh Generation and Analysts

In this third stage, a more powerful machine, like one in the company cluster or cloud, is used to generate a high resolution 3D mesh and then perform the analysis. This stage only needs information (a, e, f). The first item (a) is the full CAD model (STEP format) needed to generate the mesh. The last item (f) is the simulation setup, like boundary conditions and material properties. The second item (e) is needed to make the link between (a) and (f). By using the information from (e), we can know exactly which face/faces in the CAD model correspond to the face ID.

FIG. 19 is an example of a DMU file which contains the assembly tree for the model, i.e., the assembly tree of file (b). It contains parent/child information and the name of the parts, as well as other information.

FIG. 20 is an example of part of a COMP file (e) showing information for a part. The COMP file is that of the geometry description. It includes the face marker shown as the color, face IDs and loop information for each face in the form of points on the edges.

FIG. 21 is an example of part of an FCNT file (f) in which boundary conditions are attached to face IDs.

The flexible CAD model contains both visualization data (that is, the DMU and SLB files in the example) and a CAD model (in this case stored in STEP format) which was modified to add face markers (in this case color information). What we match is the former (used in pre-processing) with the latter (used for creating the computational mesh).

The component tree needs to be created from the original CAD model (in the example this is the Pro/Engineer format). The reason for this is that the original model is the correct structure: it is what the user must see. When converting to STEP format, this structure can change, for example some components could be broken down into sub-components during translation. This form is less convenient for the user, so the original structure should be retained.

Conversion is performed as shown in the example. As mentioned previously, the original CAD model (e.g., Pro/E format) is converted into the following elements:
a. flex_cad\model.stp
b. flex_cad\model.drnu
c. flex_cad\Shapes\part1.slb
d. flex_cad\Shapes\part2.slb
e. flex_cad\model.comp Looking at FIG. 10 above, a) represents STEP data, e) represents geometry description data and b, c, d) represent visualization data. We add face markets (e.g., colors) to the STEP file and loop markers and face IDs to the geometry description data (can be seen in the COMP file example). The same Face IDs that are added to the geometry description data are also added to the visualization data.

The face IDs in the visualization data have been set during the conversion step (Step 1 in the example). The geometry matcher needs to establish the correspondence between face IDs and faces in the STEP file. An example is shown in FIG. 8. The reason why this is non-trivial, is that the topology of the CAD data changes during translation from the original CAD format (e.g. Pro/E) to STEP format. For example, one face in the Pro/E model (thus one face ID) may be split into several faces in the STEP model. The geometry matcher needs to find this correspondence. In FIG. 8, the correspondence would be that the face with faceID=1 corresponds to Face 1 and Face 2 in the STEP model. Therefore, if a boundary condition (e.g. Pressure) is set on faceID=1, then the final computational model, which is created from the STEP file, should have pressure BC on Face 1 and Face 2.

In the Working Example, the mapping of settings from the visualization data takes place as follows:

A. The user uses pre-processing software to assign boundary conditions to face IDs (on the client machine). This information is then saved to file (e.g., text format, see the FCNT file).

B. The FCNT file together with the geometry description file (COMP) and STEP file are copied to the cloud system.

C. During geometry matching (on the cloud), loop and color information are used to find the correspondence between face IDs (found inside the geometry description file) and faces in the STEP file.

D. Once the matching is found, since the face IDs in the geometry description file (model file) are the same as those in the visualization data, the boundary conditions inside the FCNT file are transferred to the STEP faces corresponding to that face ID.

There is no need for any special mapping process to map the result data back for display using the visualization data. The result is computed on the mesh so it is not related to the CAD data. In effect, the CAD geometry is replaced by the mesh geometry (which is close to the CAD geometry, since the mesh follows the contours of the CAD geometry).

Some benefits of invention embodiments over the state of the art are the following:

In a cloud environment, setting of model information like boundary conditions may be on a client computer, using a simple and light-weight geometry format, and the mapping of this information to a full 3D CAD model can be used for mesh generation and solving in the cloud.

Also in a cloud environment, invention embodiments provide a way of performing CAE without having access to the full 3D CAD data on the client computer but only in the cloud environment, thus enhancing security.

In general, embodiments provide an efficient and reliable 3D CAD format for long term archiving of simulation models.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of translating a Computer Aided Design (CAD) model of a product constructed for Computer Aided Engineering (CAE) analysis into a flexible form, the CAD model including an assembly of components including assembly faces and the method comprising:
converting an original CAD model into a different format to provide a new-format CAD model useable in CAE analysis;
providing visualization data including an assembly tree extracted from the original CAD model, the assembly tree including each component of an assembly forming the product and visualization information from the original CAD model for each assembly face of components in the assembly tree, the visualization data being provided for use on a computer operated by a user; and
providing geometry information including matching information unambiguously identifying each assembly face, the geometry information and the new-format CAD model being useable through a cloud computing environment;
wherein the geometry information allows assembly faces to be matched with CAD faces in the new-format CAD model, face markers having been generated by reading data from the original CAD model and used to mark corresponding faces CAD of the new-format CAD model and of the geometry information, the new-format CAD model including a new-format face marker for each CAD face of the new-format CAD model, and the geometry information including the same face marker for the corresponding assembly face.

2. A method according to claim 1, wherein the matching information for each assembly face includes at least one loop marker in a form of at least 3 points on a loop of each assembly face.

3. A method according to claim 1, wherein the new-format face markers and geometry face markers are compared to narrow options before a final match between assembly faces and CAD faces is made using the matching information.

4. A method according to claim 1, wherein a face ID for each assembly face is stored as part of the visualization data and as part of the geometry information.

5. A method according to claim 1, wherein the CAE analysis includes a mesh generation process and a solving process.

6. A method according to claim 1, wherein a mesh generation process and solving process are carried out using the new-format CAD model in a cloud environment and input of CAE settings is carried out using visualization data on a user computer.

7. A method according to claim 1, wherein the visualization information is a discredited version of an analytical model description in the original CAD model.

8. A method of a user setting conditions for Computer Aided Engineering (CAE) analysis of an original Computer Aided Design (CAD) model of a product converted into a new format for use in CAE analysis, the original CAD model including an assembly of components including assembly faces and the method comprising:
downloading visualization data to a user computer, the visualization data including an assembly tree extracted from the original CAD model, the assembly tree including each component of an assembly forming the product, and the visualization data also including visualization information from the original CAD model for each assembly face of the components in the assembly tree;
displaying, by the user computer, the visualization data downloaded in the downloading, the visualization data being generated from CAD geometry that is different from a new-format CAD model;
adding, based on an input of a user, CAE settings including boundary conditions using assembly faces in the visualization data; and
wherein the CAE settings are transferred to a cloud computer for mapping onto a new-format CAD model, without the new-format CAD model being available to the user computer.

9. A cloud computer method of preparing for Computer Aided Engineering (CAE) analysis of a Computer Aided Design (CAD) model of a product converted into a new-format CAD model, the CAD model including an assembly of components including assembly faces, the method comprising:
storing, by a cloud computer, a new-format CAD model converted from an original CAD model and geometry information including matching information identifying each assembly face of an assembly tree extracted from the original CAD model, the assembly tree including each component of an assembly forming the product;
receiving CAE settings entered using visualization data, the CAE settings referring to assembly faces;
matching the assembly faces to corresponding CAD faces in the new-format CAD model using the geometry information; and
mapping the CAE settings to the corresponding CAD faces in the new-format CAD model,
wherein face markers are generated by reading data from the original CAD model and used to mark the corresponding faces CAD of the new-format CAD model and of the geometry information, the new-format CAD model including a new-format face marker for each CAD face of the new-format CAD model; and the geometry information including the same face marker for the corresponding assembly face.

10. A cloud computer method of performing Computer Aided Engineering (CAE) analysis of a Computer Aided Design (CAD) model of a product converted into a new format, the CAD model including an assembly of components comprising assembly faces and the method comprising:
the cloud computer preparing for CAE according to claim 9;
the cloud computer carrying out CAE using the new-format CAD model and mapping results from CAD faces onto the assembly faces for display in the visualization data which is available to a local user of a less powerful user computer.

11. A method according to claim 9, wherein the CAE settings include boundary information for CAE analysis.

12. A computer apparatus operable to translate a Computer Aided Design (CAD) model of a product constructed for Computer Aided Engineering (CAE) analysis into a flexible form, the CAD model including an assembly of components including assembly faces and the apparatus comprising:
- a converter operable to:
  - convert an original CAD model into a different format to provide a new-format CAD model useable in CAE analysis;
  - extract an assembly tree from the original CAD model, the assembly tree including each component of an assembly forming the product;
  - provide visualization data including the assembly tree and visualization information from the original CAD model for each assembly face of the components in the assembly tree, the visualization data being provided for use on a computer operated by a user; and to
  - provide geometry information including matching information unambiguously identifying each assembly face, the geometry information and the new-format CAD model being useable through a cloud computing environment;
- wherein the matching information allows assembly faces to be matched with CAD faces in the new-format CAD model,
- face markers having been generated by reading data from the original CAD model and used to mark corresponding faces CAD of the new-format CAD model and of the geometry information, the new-format CAD model including a new-format face marker for each CAD face of the new-format CAD model, and the geometry information including the same face marker for the corresponding assembly face.

13. A user computer operable to allow a user to set conditions for Computer Aided Engineering (CAE) analysis of a Computer Aided Design (CAD) model of a product converted from an original model into a new format, wherein the original model includes an assembly of components including assembly faces and a user computer comprising:
- an input operable to read visualization data including an assembly tree extracted from an original CAD model, the assembly tree including each component of an assembly forming the product, and visualization information from the original CAD model for each assembly face in the assembly tree;
- a display operable to display the visualization data, wherein the CAD geometry from which the visualization data has been generated is not the same as the new-format CAD model;
- a user interface operable to allow a user to add CAE settings including boundary conditions using assembly faces in the visualization data; and
- an output operable to transfer the CAE settings to a cloud computer for analysis, without the new-format CAD model being available to the user computer.

14. A cloud computer operable to prepare for Computer Aided Engineering (CAE) analysis of a Computer Aided Design (CAD) model of a product converted into a new format, where an original model includes an assembly of components comprising assembly faces and the cloud computer comprises:
- a memory arranged to store a new-format CAD model converted from an original CAD model and arranged to store geometry information including matching information identifying each assembly face of an assembly tree extracted from the original CAD model, the assembly tree including each component of an assembly forming the product; face markers having been generated by reading data from the original CAD model and used to mark corresponding faces CAD of the new-format CAD model and of the geometry information, the new-format CAD model including a new-format face marker for each CAD face of the new-format CAD model; and the geometry information including the same face marker for the corresponding assembly face;
- an input operable to receive CAE settings entered using visualization data and referring to assembly faces;
- a matcher operable to match the assembly faces to corresponding CAD faces in the new-format CAD model using the geometry information; and
- a transferer operable to transfer the CAE settings to the corresponding CAD faces in the new-format CAD model.

15. A cloud computer method of preparing for Computer Aided Engineering (CAE) analysis of a Computer Aided Design (CAD) model of a product converted into a new format, the CAD model including an assembly of components including assembly faces, the method comprising:
- storing, by a cloud computer, a new-format CAD model converted from an original CAD model and storing geometry information including matching information identifying each assembly face of an assembly tree extracted from the original CAD model, the assembly tree including each component of an assembly forming the product;
- receiving CAE settings including boundary conditions entered using visualization data the CAE settings referring to assembly faces;
- matching the assembly faces to corresponding CAD faces in the new-format CAD model using the geometry information; and
- mapping the CAE settings to the corresponding CAD faces in the new-format CAD model;
- wherein the matching information for each assembly face includes at least one loop marker in a form of at least 3 points on a loop of each assembly face.

16. A cloud computer operable to prepare for Computer Aided Engineering (CAE) analysis of a Computer Aided Design (CAD) model of a product converted into a new format, where an original model includes an assembly of components comprising assembly faces and the cloud computer comprises:
- a memory arranged to store a new-format CAD model converted from an original CAD model and arranged to store geometry information including matching information identifying each assembly face of an assembly tree extracted from the original CAD model, the assembly tree including each component of an assembly forming the product;
- an input operable to receive CAE settings including boundary conditions entered using visualization data and referring to assembly faces;
- a matcher operable to match the assembly faces to corresponding CAD faces in the new-format CAD model using the geometry information; and
- a transferer operable to transfer the CAE settings to the corresponding CAD faces in the new-format CAD model;
- wherein the matching information for each assembly face includes at least one loop marker in a form of at least 3 points on a loop of each assembly face.

* * * * *